(12) United States Patent
Finkenauer et al.

(10) Patent No.: US 9,080,086 B2
(45) Date of Patent: Jul. 14, 2015

(54) MELAMINE-REINFORCED UF GLUES WITH UP TO 0.9% OF MELAMINE FOR PRODUCING MEDIUM-DENSITY FIBERBOARD

(71) Applicant: BASF SE, Ludwigshafen (DE)

(72) Inventors: Michael Finkenauer, Worms (DE); Konrad Roschmann, Ladenburg (DE); Ralph Lunkwitz, Neustadt (DE); Stephan Weinkötz, Neustadt (DE)

(73) Assignee: BASF SE (DE)

( * ) Notice: Subject to any disclaimer, the term of this patent is extended or adjusted under 35 U.S.C. 154(b) by 68 days.

(21) Appl. No.: 13/852,427

(22) Filed: Mar. 28, 2013

(65) Prior Publication Data

US 2013/0331541 A1    Dec. 12, 2013

Related U.S. Application Data

(60) Provisional application No. 61/617,085, filed on Mar. 29, 2012.

(51) Int. Cl.
*C08G 12/12* (2006.01)
*C09J 161/30* (2006.01)
*C08G 12/00* (2006.01)

(52) U.S. Cl.
CPC ................... *C09J 161/30* (2013.01)

(58) Field of Classification Search
CPC ..................................... C08G 12/12
USPC ................ 528/232, 254, 256, 503; 428/507; 264/239
See application file for complete search history.

(56) References Cited

U.S. PATENT DOCUMENTS

| | | | |
|---|---|---|---|
| 4,536,245 A | 8/1985 | Shiau et al. | |
| 4,814,422 A | 3/1989 | Diem et al. | |
| 2008/0227889 A1 | 9/2008 | Machherndl et al. | |
| 2012/0064355 A1 | 3/2012 | Kasmayr et al. | |
| 2012/0202041 A1 | 8/2012 | Kasmayr et al. | |

FOREIGN PATENT DOCUMENTS

| | | |
|---|---|---|
| EP | 0001596 A2 | 5/1979 |
| EP | 0864603 A2 | 9/1998 |
| EP | 1391478 A1 | 2/2004 |
| EP | 2216363 A1 | 8/2010 |
| WO | WO-2009080798 A1 | 7/2009 |

OTHER PUBLICATIONS

U.S. Appl. No. 61/357,552.
U.S. Appl. No. 61/489,274.
U.S. Appl. No. 61/579,671.
U.S. Appl. No. 61/617,085.
U.S. Appl. No. 61/579,673.
Mezger, T., Das Rheologie-Handbuch, pp. 241-248, 2011.
Troughton, G. E., et al. "Effect of Fortifier Addition on the Curing Reactions of Urea-Formaldehyde Adhesives" Bd. 29 (1975) H. 6, pp. 214-217.

*Primary Examiner* — Duc Truong
(74) *Attorney, Agent, or Firm* — Drinker Biddle & Reath LLP

(57) ABSTRACT

The present invention relates to a process for producing melamine-urea-formaldehyde resins with up to 0.9% of melamine by reacting
a) urea which comprises from 0 to 10% by weight of one or more compounds A, formaldehyde, and melamine in the presence of a base at a pH of from 7.5 to 11, at a temperature of from 20 to 120° C., and at a pressure of from 0.1 to 10 bar,
b) and then carrying out reaction in the presence of an acid which optionally comprises urea with from 0 to 10% by weight of one or more compounds A, at a temperature of from 60 to 180° C., and at a pressure of from 0.1 to 10 bar, and
c) and then adding urea which comprises from 0 to 10% by weight of one or more compounds A,
which comprises carrying out b) at a pH of from 4 to 5.9.

16 Claims, No Drawings

MELAMINE-REINFORCED UF GLUES WITH UP TO 0.9% OF MELAMINE FOR PRODUCING MEDIUM-DENSITY FIBERBOARD

RELATED APPLICATIONS

This Application claims the benefit of U.S. Provisional Application 61/617,085 filed on Mar. 29, 2012 which is incorporated by reference.

The present invention relates to a process for producing melamine-urea-formaldehyde resins (MUF resins) by reacting formaldehyde, urea, and melamine in three stages.

WO-A-2009/080798 discloses a continuous process for producing melamine-urea-formaldehyde resins (MUF) with from 0.1 to 15% by weight melamine content, where step a) produces a mixture of an amino compound (urea or melamine) with aqueous formaldehyde solution, then step b) adds a catalyst, and step c) involves condensation in a continuously operated reactor, e.g. a tubular reactor. An optional step d) can then add another amino compound, or the same amino compound as in step a). In order to produce MUF glues with up to 0.9% by weight melamine content in said process, the amino compound in step a) has to be urea and the amino component in step d) has to be melamine. The addition of melamine at a late juncture in the production of MUF glues is disadvantageous, since glues of that type harden more slowly. The adverse effect of subsequent addition of melamine is known by way of example from G. E. Troughton, S. Chow, Holzforschung, 1975, pp. 214 to 217. Said process cannot produce MUF glues with up to 0.9% by weight of melamine where the melamine is already present during the condensation phase (step c).

U.S. Pat. No. 4,536,245 discloses MUF resins with a low formaldehyde emission rate which comprise from 0.15 to 40% by weight of melamine and which have a molar formaldehyde:urea ratio of from 1.3:1 to 0.9:1. However, at least 4% of melamine is necessary for a substantial reduction of formaldehyde emission. The MUF resins are produced in a process composed of a 1st stage with methylolation of urea with formaldehyde and optionally melamine in an alkali medium, a 2nd stage with condensation at a pH of from 6 to 8.3, and addition of urea and melamine, and a 3rd stage with a scavenger, e.g. urea.

A disadvantage of said process is the amount of melamine required for substantial reduction of formaldehyde emission.

It was therefore an object of the present invention to eliminate the abovementioned disadvantages.

Accordingly, a novel and improved process has been found for producing melamine-urea-formaldehyde resins with up to 0.9% of melamine by reacting
a) urea which comprises from 0 to 10% by weight of one or more compounds A, formaldehyde, and melamine in the presence of a base at a pH of from 7.5 to 11, at a temperature of from 20 to 120° C., and at a pressure of from 0.1 to 10 bar,
b) and then carrying out reaction in the presence of an acid which optionally comprises urea with from 0 to 10% by weight of one or more compounds A, at a temperature of from 60 to 180° C., and at a pressure of from 0.1 to 10 bar, and
c) and then adding urea which comprises from 0 to 10% by weight of one or more compounds A,
which comprises carrying out b) at a pH of from 4 to 5.9; the use of said resins as binders has also been found, as have lignocellulose-containing moldings which comprise said binder.

The present invention can be carried out as follows:

In a), urea which comprises from 0 to 10% by weight of one or more compounds A (the term "urea/urea mixture" being used hereinafter), formaldehyde, and melamine, in any desired sequence, can be used as initial charge or can be added, and can be reacted at a pH of from 7.5 to 11, preferably from 8 to 10.5, particularly preferably from 8.5 to 10. The pH can be adjusted by adding base at one or more junctures during said reaction. The pH is generally adjusted at the start of the reaction and optionally further adjusted by adding base. Urea/urea mixture and formaldehyde can also be used in the form of formaldehyde-urea/urea mixture precondensate.

In a preferred embodiment, formaldehyde can be used as initial charge with a base in a), and then urea/urea mixture can be added.

In another preferred embodiment, a mixture of formaldehyde and a base can be added in a) to the initial charge of urea/urea mixture.

In both preferred embodiments, the melamine can be introduced into the reaction mixture in a) at any time.

The reaction in a) generally takes place at temperatures of from 20 to 120° C., preferably from 20 to 110° C., particularly preferably from 20 to 95° C., in particular from 60 to 90° C., and at a pressure of from 0.1 to 10 bar, preferably from 0.5 to 5 bar, particularly preferably from 0.9 to 1.5 bar, in particular at atmospheric pressure. It is preferable that the formaldehyde, the base, or the mixture of formaldehyde and base is heated to the abovementioned temperatures before mixing with urea/urea mixture and melamine.

The further reaction of the reaction mixture can then take place in b) in the presence of an acid at a pH of from 4 to 5.9, preferably from 4.1 to 5.5, particularly preferably from 4.2 to 5.3, in particular from 4.5 to 5.2, and at temperatures of from 60 to 180° C., preferably from 90 to 180° C., particularly preferably from 100 to 150° C., in particular from 110 to 140° C., and at a pressure of from 0.1 to 10 bar, preferably from 0.5 to 5 bar, particularly preferably from 0.9 to 1.5 bar, in particular at atmospheric pressure. The reaction time, the temperature, and the pressure can be used here to adjust the viscosity of the reaction mixture, which is generally from 10 to 5000 Pas, preferably from 100 to 2000 mPas, particularly preferably from 200 to 800 mPas, measured in an Anton Paar MCR 51 viscometer using a cone-and-plate measurement system at room temperature (Thomas Mezger, Das Rheologie-Handbuch [The rheology handbook], Hanover, Vincentz, 2000, p. 203 and DIN EN ISO 3219:1994-10).

At any desired juncture during b), it is optionally possible to add one or more portions of urea/urea mixture, and the amount of urea/urea mixture added during b) is generally selected to be from 0 to 20% by weight, based on the total amount of urea/urea mixture, preferably from 0 to 15% by weight, particularly preferably from 0 to 10% by weight.

The further reaction of the reaction mixture in c) can then take place after addition of a base at a pH of from 6.5 to 11, preferably from 7 to 10, particularly preferably from 7.5 to 9.5, in particular from 8 to 9, with addition of urea/urea mixture at temperatures of from 30 to 120° C., preferably from 40 to 100° C., particularly preferably from 45 to 95° C., in particular from 50 to 90° C., and at a pressure of from 0.1 to 10 bar, preferably from 0.5 to 5 bar, particularly preferably from 0.9 to 1.5 bar, in particular at atmospheric pressure. Optionally, and generally preferably, the diluent, such as water, can be removed to some extent in vacuo, and another addition of urea/urea mixture can then take place at the abovementioned temperatures and pressures.

The method of addition can be such that the urea and optionally the compound A is/are mixed in solid form or in the form of solution into the reaction mixture, or else that the resin is stirred into a urea solution which optionally comprises compound A. The mixing of the two components can take place at room temperature or else by a method such that the resin, the temperature of which is still up to 80° C., is mixed with the urea. The mixture of the invention can then be cooled to room temperature. The pH of the cooled mixture is preferably adjusted to a pH of from 8 to 10.

The process of the invention is usually carried out in such a way that the solids content of the MUF resins is from 50 to 70% by weight, based on the aqueous resin mixture. However, it is also possible to increase the solids content up to a content of from 60 to 80% by weight by removing water by distillation at from 30 to 60° C. under reduced pressure.

The process of the invention can also be carried out in reactors connected to one another, e.g. in a stirred-tank cascade. By way of example it is possible here to carry out step a) in the first reactor, step b) in the second reactor, and step c) in the third reactor.

The molar ratio of formaldehyde to the total amount of urea and optionally compound A in a) is generally from 1.5:1 to 4:1, preferably from 2:1 to 3:1, particularly preferably from 2:1 to 2.6:1.

The molar ratio of formaldehyde to melamine in a) is generally from 3000:1 to 50:1, preferably from 2500:1 to 100:1, particularly preferably from 2250:1 to 150:1.

The molar ratio of formaldehyde to $NH_2$ groups [F (2×U+ 3×M)] in a) is generally from 0.8:1 to 2:1, preferably from 1:1 to 1.5:1, particularly preferably from 1:1 to 1.3:1. The compound A is counted as U here.

The optional addition of urea/urea mixture in b) can take place in one, two or more additions. The amount of urea/urea mixture here is generally selected in such a way as to give a molar ratio of formaldehyde to total amount of urea and compound A of from 1.4:1 to 4:1, preferably from 1.8:1 to 3:1, particularly preferably from 1.8:1 to 2.6:1.

The addition of urea/urea mixture in c) can take place in one, two or more additions. The amount of urea/urea mixture here is generally selected in such a way as to give a molar ratio of formaldehyde to total amount of urea and compound A of from 0.7:1 to 1.5:1, preferably from 0.75:1 to 1.2:1, particularly preferably from 0.8:1 to 1.05:1, very particularly preferably from 0.8:1 to 0.89:1.

A suitable form of formaldehyde is paraformaldehyde or aqueous formaldehyde solutions of strength from 5 to 70% by weight, preferably aqueous solutions of strength from 30 to 60% by weight, particularly preferably taking the form of aqueous solutions of strength from 45 to 55% by weight.

Urea is used either in solid form or in the form of aqueous solution, preferably in the form of aqueous solution, where the concentration of the urea in the solution is from 30 to 85%, preferably from 40 to 80%, particularly preferably from 50 to 75%.

The formaldehyde (F) and the urea (U) can also be used at least to some extent in the form of aqueous formaldehyde-urea solutions and/or of aqueous formaldehyde-urea-precondensate solutions. The pH of the aqueous formaldehyde solution, aqueous formaldehyde-urea solution, and/or aqueous formaldehyde-urea-precondensate solution is advantageously from 4 to 5.5, in particular from 4.5 to 5.

The concentration of the aqueous solution of formaldehyde and urea is advantageously from 50 to 80% by weight, and the ratio by weight of urea to formaldehyde is preferably from 10:90 to 70:30, in particular from 20:80 to 55:45, particularly preferably from 30:70 to 50:50. This solution can comprise small amounts of adducts of, and low-molecular-weight condensates of, urea and formaldehyde.

It is moreover possible to use an aqueous formaldehyde-urea-precondensate solution which has been produced by reaction of urea and formaldehyde at a pH greater than 7. The ratio by weight of urea to formaldehyde is advantageously from 10:90 to 70:30, preferably from 20:80 to 55:45, in particular from 30:70 to 50:50. The concentration of the aqueous formaldehyde-urea-precondensate solution is preferably from 50 to 80%.

It is possible to use compounds A, where these can react with formaldehyde, to replace some of the urea, irrespective of whether it is used in the form of solid urea, in the form of urea solution, in the form of formaldehyde-urea solution, or in the form of formaldehyde-urea-precondensate solution. Suitable compounds A are modified ureas, such as ethyleneurea, ethylenediurea, or dipropylenetriurea, or guanamines, such as benzoguanamine, or amides, such as caprolactam, in amounts of from 0 to 10% by weight, preferably from 0 to 8% by weight, particularly preferably from 0 to 5% by weight, based on the total amount of urea. That means from 100 to 90% by weight of urea and from 0 to 10% by weight of compound A, preferably from 100 to 92% by weight of urea and from 0 to 8% by weight of compound A, particularly preferably from 100 to 95% by weight of urea and from 0 to 5% by weight of compound A, i.e. pure urea (100% by weight) or a mixture of urea and compound A (from >100 to 90% by weight of urea and from <0 to 10% by weight of compound A), where these give a total of 100% by weight.

A suitable form of melamine is melamine powder or liquid or pulverulent melamine-formaldehyde resins (MF resins), or melamine-urea-formaldehyde resins (MUF resins), preferably MF and MUF resins, particularly preferably pulverulent MF resins and pulverulent MUF resins, very particularly preferably pulverulent MF resins. If MF resins or MUF resins are used as melamine source, then the amounts of formaldehyde and urea comprised therein are taken into account in calculation of the molar ratios.

Melamine-formaldehyde resin powders are generally produced by spray drying of aqueous melamine-formaldehyde condensates.

Suitable diluents are alcohols such as $C_1$-$C_4$-alkanols, e.g. methanol, ethanol, n-propanol, isopropanol, propanol isomer mixtures, n-butanol, isobutanol, sec-butanol, tert-butanol, butanol isomer mixtures, water and mixtures of these, preferably water or aqueous solutions of $C_1$-$C_4$-alkanols of strength from 1 to 99% by weight, particularly preferably water.

Suitable bases are any of the alkaline compounds generally and conventionally used, for example inorganic bases, for example alkali metal hydroxides or alkaline earth metal hydroxides, e.g. sodium hydroxide, alkali metal carbonates or alkaline earth metal carbonates, or organic amines, for example tertiary amines, such as tributylamine or triethylamine, or tertiary alkanolamines, such as triethanolamine or methyldiethanolamine, or a mixture of these, preferably aqueous alkali metal hydroxides and triethanolamine, particularly preferably sodium hydroxide solution.

Suitable acids are organic acids, such as formic acid, acetic acid, maleic acid, or inorganic acids, such as nitric acid or sulfuric acid, preferably organic acids, particularly preferably formic acid.

The melamine content of the melamine-urea-formaldehyde resins of the invention is generally ≥ (greater than/equal to) 0.05% by weight and ≤ (less than/equal to) 0.9% by weight, based on the total weight of the resin, i.e. from 0.05 to 0.9% by weight, preferably from 0.1 to 0.7% by weight, particularly preferably from 0.2 to 0.5% by weight.

The melamine-urea-formaldehyde resins of the invention can optionally be blended prior to use with urea-formaldehyde condensates which have a ratio by weight of formaldehyde to urea of from 2:1 to 0.85:1, and/or with urea in solid form or in the form of aqueous solution. The solids content of the urea-formaldehyde condensate is generally from 50 to 80%. The solids content can be determined by weighing the liquid resin (e.g. about 1 g) into a flat sheetmetal dish and then drying at 120° C. for two hours and reweighing (M. Dunky, P. Niemz, Holzwerkstoffe and Leime [Timber-derived materials and glues], Springer, Berlin, 2002, p. 458). The blending generally takes place with urea-formaldehyde condensates advantageously with a ratio by weight of melamine-urea-formaldehyde resin of the invention to urea-formaldehyde condensates of from 99:1 to 10:90, in particular from 95:5 to 50:50. The blending with urea generally takes place with a ratio of melamine-urea-formaldehyde resin of the invention to urea or urea solution of from 99:1 to 70:30, in particular from 98:2 to 80:20.

Amounts of up to 10% by weight of further additives can be incorporated into said resins. These can involve by way of example alcohols, such as ethylene glycol or diethylene glycol, or saccharides. It is equally possible to use water-soluble polymers based on acrylamide, ethylene oxide, N-vinylpyrrolidone, or vinyl acetate, or else copolymers with said monomers. Fillers can be added to the resins, examples being cellulose fibers or a mixture of these. They can also comprise carbonates or a mixture of these.

In order to improve the water-dilutability of the melamine-urea-formaldehyde resins, sulfites, disulfites, and hydrogensulfites can be used, preferably comprising, as cations, alkali metals such as lithium, sodium, or potassium, preferably sodium or potassium, particularly preferably sodium, or ammonium. An amount that can be used of these is from 0.01 to 10% by weight, preferably from 0.05 to 1% by weight, based on the weight of the liquid resin.

The resins of the invention generally have a shelf life of a number of weeks at 20° C.

The resins of the invention are suitable as binders, in particular for producing lignocellulose-containing moldings, for example particle board, fiberboard, or OSB (Oriented Strand Board). The mixtures of the invention are also suitable for the surface-gluing of wood, e.g. for producing plywood, single-layer board and multilayer board, and glued laminated timber. The resins of the invention are particularly suitable for producing MDF (medium-density fiberboard), in particular when the gluing takes place in the blowline. In the blowline process, after defibration of the wood, the resin is injected, in the refiner, into the fiber stream, which is moving at high velocity. The glued fibers are then dried (M.Dunky, P.Niemz, Holzwerkstoffe and Leime [Timber-derived materials and glues], Springer, Berlin, 2002, p. 145).

The reactivity of the binder mixtures during the hardening process can be increased by also adding to them, immediately prior to processing, a hardener such as ammonium salts, e.g. ammonium chloride, ammonium sulfate, ammonium nitrate, ammonium phosphates, or carboxylic acids, e.g. formic acid and oxalic acid, or Lewis acids, e.g. aluminum chloride, or acidic salts, such as aluminum sulfate, or mineral acids, e.g. sulfuric acid, or a mixture of these. The hardeners can be mixed with the aqueous binder ("glue liquor") and then by way of example sprayed onto timber particles or onto fibers, or the hardeners can be applied separately from the binder to the substrate.

The lignocellulose-containing moldings of the invention, e.g. particle board, OSB, or medium-density fiberboard (MDF), can be produced by way of example by pressing from 5 to 30% by weight of solid resin, based on lignocellulose-containing material, at press temperatures of from 120 to 250° C. Hardeners, as described above, can also be used concomitantly. Under these conditions, the aminoplastic resin generally hardens rapidly, and timber-derived materials with good mechanical properties are obtained.

Advantageous features of the melamine-urea-formaldehyde resins of the invention are not only the simple method of production but also that, when comparison is made with conventional resins of comparable constitution, an improvement in technical processing properties is achieved, and particular features of the resins of the invention are low swelling values and high strengths with low formaldehyde emissions. The low melamine content is also advantageous.

EXAMPLES

Inventive Example 1

Glue with 0.33% of Melamine and F:U=1.01 (Melamine Component=MF Resin Powder)

1138 g (18.6 mol) of 49% aqueous formaldehyde solution were heated to 87° C. and adjusted with 10% sodium hydroxide solution to a pH of 7.7, and 495 g (8.24 mol) of urea were added within 30 min, and then 11.5 g of a melamine resin powder (produced from formaldehyde solution and melamine by alkaline condensation followed by spray drying, comprising 60% by weight of melamine and 40% by weight of formaldehyde) were added, and the mixture was stirred for 15 min at 87° C. and at a pH of from 7.0 to 6.8. After heating to 92° C., the mixture was adjusted to a pH of 5.0 with formic acid, and condensed at 95° C. until a viscosity of 550 mPas was achieved (viscosity measurement on a sample at RT), and then the mixture was adjusted to a pH of 8.5 with 10% sodium hydroxide solution, and cooled to 85° C., and 302 g (5.02 mol) of urea were added within 18 min. 230 g of water were then removed by distillation at 60° C. in vacuo, and a further 309 g (5.14 mol) of urea were added at 50° C. within 18 min. This gave 2031 g of glue with the following physical properties:

solids content 66.9% (measured via weight difference after 2 h at 120° C. in a drying oven)

viscosity 561 mPas (at a shear rate of 250 $s^{-1}$) pH 8.2.

Inventive Example 2

Glue with 0.33% of Melamine and F:U=1.01 (Melamine Component=Solid Melamine)

1148 g (18.8 mol) of 49% aqueous formaldehyde solution were heated to 87° C. and adjusted with 10% sodium hydroxide solution to a pH of 7.7, and 495 g (8.24 mol) of urea were added within 30 min, and then 6.7 g (0.053 mol) of melamine were added, and the mixture was stirred for 15 min. After heating to 92° C., the mixture was adjusted to a pH of 5.0 with formic acid, and condensed at 95° C. until a viscosity of 550 mPas was achieved (viscosity measurement see Inventive example 1), and then the mixture was adjusted to a pH of 8.5 with 10% sodium hydroxide solution, and cooled to 85° C., and 302 g (5.02 mol) of urea were added within 18 min. 230 g of water were then removed by distillation at 60° C. in vacuo, and a further 309 g (5.14 mol) of urea were added at 50° C. within 18 min. This gave 2031 g of glue with the following physical properties:

solids content 67% (measured via weight difference after 2 h at 120° C. in a drying oven)

viscosity 532 mPas (at a shear rate of 250 $s^{-1}$)

pH 8.2.

The melamine content of the resin is 0.33% by weight; the molar F:U ratio is 1.01.

Comparative Example 1 (In Accordance with U.S. Pat. No. 4,536,245, Example No.: 1)

Glue with 3.9% of Melamine and F:U=1.01
Production Process in Accordance with Example 1, U.S. Pat. No. 4,536,245

Comparative Example 2

Glue without Melamine and F:U=1.01
1148 g (18.8 mol) of 49% aqueous formaldehyde solution were heated to 87° C. and adjusted with 10% sodium hydroxide solution to a pH of 7.7, and 495 g (8.24 mol) of urea were added within 30 min, and the mixture was stirred for 15 min. After heating to 92° C., the mixture was adjusted to a pH of 4.8 with formic acid, and condensed at 95° C. until a viscosity of 550 mPas was achieved (viscosity measurement see inventive example 1), and then the mixture was adjusted to a pH of 8.5 with 10% sodium hydroxide solution, and cooled to 85° C., and 302 g (5.02 mol) of urea were added within 18 min. 235 g of water were then removed by distillation at 60° C. in vacuo, and a further 309 g (5.14 mol) of urea were added at 50° C. within 18 min. This gave 2019 g of resin with the following physical properties:

solids content 66.9% (measured via weight difference after 2 h at 120° C. in a drying oven)
viscosity 528 mPas (at a shear rate of 250 s$^{-1}$)
pH 8.2.

Laboratory Production Process for the Particle Board
a) Mixing of Starting Materials
500 g of spruce particles were used as initial charge in a mixer. The glue liquor made of 100 parts and 4 parts of a 52% aqueous ammonium nitrate solution and of 10 parts of water was then applied. The amount of glue liquor here was selected to give a glue factor of 10%. The glue factor is the quotient calculated from the mass of glue solids and the mass of timber solids.
b) Pressing of Glued Particles
The glued particles were precompacted cold in a 30×30 cm mold, and then pressed in a heated press (press temperature 200° C., press time 200 s). The thickness of each of the boards was 15.7 mm.
Testing of Timber Products
Density
Density was determined 24 hours after production in accordance with EN 1058.
Transverse Tensile Strength
Transverse tensile strength was determined in accordance with EN 319.
Swelling Values
Swelling values were determined in accordance with EN 317 after storage in water for 24 h.
Formaldehyde Emission (Perforator Method)
Formaldehyde emission was determined in accordance with EN 120.

|  | Melamine content [%] | F:U molar ratio | Density [kg/m$^3$] | Transverse tensile strength [N/mm$^2$] | Swelling value after 24 h [%] | Perforator value [mg F/100 g] |
|---|---|---|---|---|---|---|
| Inventive example 1 | 0.33 | 1.01 | 585 | 0.60 | 20 | 5.5 |
| Inventive example 2 | 0.33 | 1.01 | 582 | 0.61 | 19 | 5.3 |
| Comparative example 1 | 3.9 | 1.01 | 588 | 0.49 | 20 | 5.5 |
| Comparative example 2 | 0 | 1.01 | 584 | 0.55 | 25 | 6.1 |

The invention claimed is:
1. A process for producing melamine-urea-formaldehyde resins with up to 0.9% of melamine by reacting
   a) urea which comprises from 0 to 10% by weight of one or more compounds A, formaldehyde, and melamine in the presence of a base at a pH of from 7.5 to 11, at a temperature of from 20 to 120° C., and at a pressure of from 0.1 to 10 bar,
   b) and then carrying out reaction in the presence of an acid which optionally comprises urea with from 0 to 10% by weight of one or more compounds A, at a temperature of from 60 to 180° C., and at a pressure of from 0.1 to 10 bar, and
   c) and then adding urea which comprises from 0 to 10% by weight of one or more compounds A,
which comprises carrying out b) at a pH of from 4 to 5.9.
2. The process according to claim 1, wherein the melamine-urea-formaldehyde resins have at least 0.05% by weight and at most 0.9% by weight melamine content, based on the total composition of the resin.
3. The process according to claim 1, wherein b) is carried out at a pH of from 4.1 to 5.5.
4. The process according to claim 1, which is carried out in reactors connected to one another.
5. The process according to claim 1, wherein the molar ratio of formaldehyde to urea in a) is from 1.5:1 to 4:1.
6. The process according to claim 1, wherein the molar ratio of formaldehyde to melamine in a) is from 3000:1 to 50:1.
7. The process for according to claim 1, wherein the molar ratio of formaldehyde to NH$_2$ groups [F:(2×U+3×M)] in a) is from 0.8:1 to 2:1.
8. The process according to claim 1, wherein the molar ratio of formaldehyde to urea in b) is from 1.4:1 to 4:1, optionally by virtue of addition of one or more compounds A.
9. The process according to claim 1, wherein the molar ratio of formaldehyde to urea in c) is from 0.7:1 to 1.5:1.
10. The process according to claim 1, wherein said compound A comprises modified ureas from the group of ethyleneurea, ethylenediurea, or dipropylenetriurea, or guanamines or amides.
11. The process according to claim 1, wherein said compound A comprises modified ureas from the group of ethyleneurea, ethylenediurea, or dipropylenetriurea, or benzoguanamine or amides.
12. The process according to claim 1, wherein said compound A comprises caprolactam.
13. The process according to claim 1, wherein said acid comprises an organic acid selected from the group consisting of formic acid, acetic acid, and maleic acid, or an inorganic acid selected from the group consisting of nitric acid and sulfuric acid.

14. The process according to claim 1, wherein said acid is formic acid.

15. The process according to claim 1, wherein said alkaline compound comprises an inorganic base or an organic amine or a mixture thereof.

16. The process according to claim 1, wherein said alkaline compound comprises sodium hydroxide solution.

* * * * *